(12) United States Patent
Watanabe

(10) Patent No.: US 7,614,557 B2
(45) Date of Patent: Nov. 10, 2009

(54) IMAGE PRINTING SYSTEM, IMAGE INPUT APPARATUS, AND PRINTING APPARATUS

(75) Inventor: Yuichi Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 257 days.

(21) Appl. No.: 10/848,060

(22) Filed: May 19, 2004

(65) Prior Publication Data
US 2004/0233474 A1    Nov. 25, 2004

(30) Foreign Application Priority Data
May 22, 2003    (JP)    ............... 2003-144384

(51) Int. Cl.
*G06K 7/14*    (2006.01)
(52) U.S. Cl. ..................... 235/454; 235/376
(58) Field of Classification Search ................ 235/454, 235/382, 462.01, 385
See application file for complete search history.

(56) References Cited

U.S. PATENT DOCUMENTS

| | | | |
|---|---|---|---|
| 5,974,401 A | 10/1999 | Enomoto et al. | |
| 6,064,838 A * | 5/2000 | Maruta et al. | 399/79 |
| 6,226,626 B1 * | 5/2001 | Thiel | 705/407 |
| 2001/0021979 A1 | 9/2001 | Ito | |
| 2003/0002848 A1 | 1/2003 | Kawaoka et al. | |

FOREIGN PATENT DOCUMENTS

| | | |
|---|---|---|
| EP | 1 075 138 A2 | 2/2001 |
| EP | 1 133 143 A2 | 9/2001 |
| JP | 8-11180 A | 1/1996 |
| JP | 09-037014 | 2/1997 |
| JP | 10-31400 A | 2/1998 |
| JP | 2000-278467 A | 10/2000 |
| JP | 2003-91400 A | 3/2003 |

* cited by examiner

*Primary Examiner*—Daniel St.Cyr
(74) *Attorney, Agent, or Firm*—Rabin & Berdo, P.C.

(57) ABSTRACT

A scanner is connected to a printer to form a simple copying system in which the printer is controlled from the scanner. In one aspect of the invention, the scanner queries the printer to learn features implemented in the printer, and constructs a menu enabling a user of the scanner to control use of the printer's features, so that the scanner can be connected to a variety of printers without the need for firmware modifications. In another aspect of the invention, the printer has an accounting feature and manages printing fees according to account identifiers input by the scanner, eliminating the need to use copy cards to collect copying fees.

21 Claims, 22 Drawing Sheets

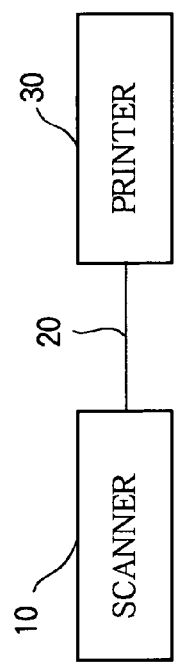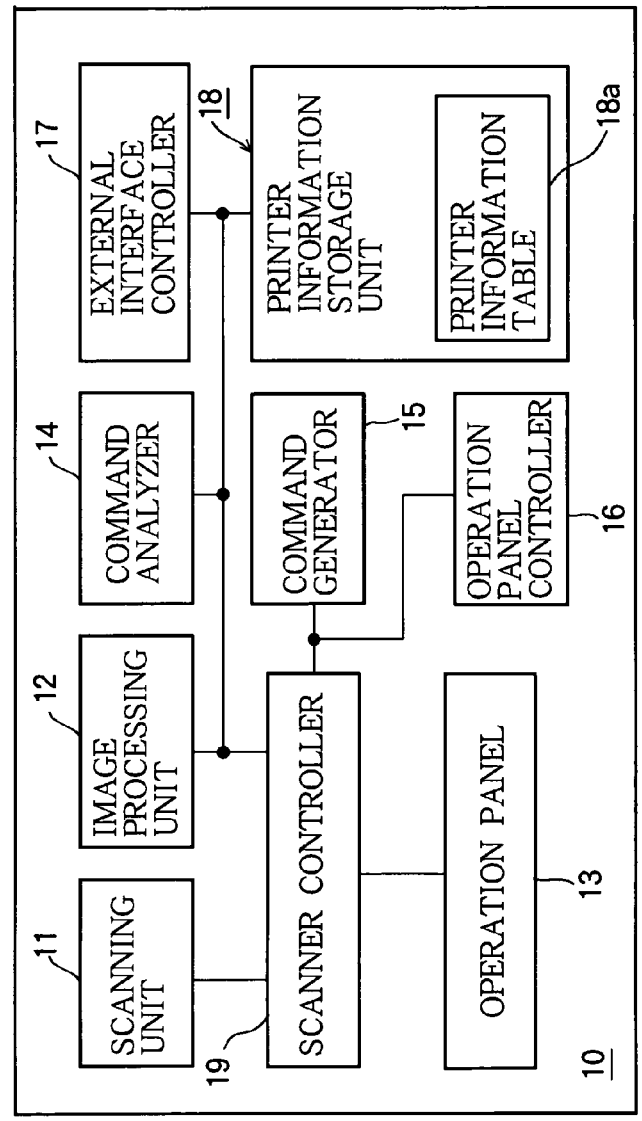

FIG.3

| NO. | OPTION NAME | STATUS | MENU DISPLAY |
|---|---|---|---|
| 1. | DOUBLE SIDED PRINTING | ON | YES |
| 2. | DOCUMENT BINDING | OFF | NO |
| 3. | HARD DISK | ON | NO |

18a PRINTER INFORMATION TABLE

| NO. | OPTION NAME | STATUS | MENU DISPLAY |
|---|---|---|---|
| 1. | DOUBLE SIDED PRINTING | ON | YES |
| 2. | DOCUMENT BINDING | OFF | NO |
| 3. | HARD DISK | ON | NO |
| 4. | ACCOUNTING | ON | NO |

25 — NO.  26 — OPTION NAME  27 — STATUS  28 — MENU DISPLAY

FIG.24

| | |
|---|---|
| COMMAND TYPE AREA | 91 |
| ACCOUNT ID AREA | 92 |
| USER ID AREA | 93 |
| JOB NAME AREA | 94 |

FIG.25

| | |
|---|---|
| COMMAND TYPE AREA | 101 |
| ACCOUNT ID AREA | 102 |
| USER ID AREA | 103 |
| JOB NAME AREA | 104 |
| RESULT AREA | 105 |

FIG.26

| | |
|---|---|
| PIDrequest | 91 |
| 1 2 3 4 | 92 |
| Scanner | 93 |
| ScannerJob | 94 |

FIG.28

| | |
|---|---|
| PIDrequest | 101 |
| 1 2 3 4 | 102 |
| Scanner | 103 |
| ScannerJob | 104 |
| OK | 105 |

FIG.29

| | |
|---|---|
| PIDrequest | 101 |
| 1 2 3 4 | 102 |
| Scanner | 103 |
| ScannerJob | 104 |
| NG | 105 |

IMAGE PRINTING SYSTEM, IMAGE INPUT APPARATUS, AND PRINTING APPARATUS

BACKGROUND OF THE INVENTION

1. Field of the Invention

The present invention relates to an image printing system, image input apparatus, and printing apparatus, more particularly to an image copying system comprising an apparatus such as a scanner connected to a separate apparatus such as a printer.

2. Description of the Related Art

It is known art to connect a scanner and a printer to function as a simple copying system in which an image is input by the scanner, transmitted to the printer, and printed, as disclosed, for example, in Japanese Unexamined Patent Application Publication No. 9-37014. In a conventional system of this type, the scanner and printer both have options that the user can select from menus, and the scanner's menu includes printing options configured to match the options of a particular type of printer, so that the scanner can control the printer without intervention by a host device such as a personal computer. The menus are generated by firmware in the scanner and printer.

Dedicated copying machines, also referred to as copiers, often use copy cards to collect copying fees and restrict use of the copier to paying users. Some printers also have accounting features for restricting usage and calculating printing fees.

A problem in the simplified copying system described above is that the system is limited to the type of printer for which the scanner's menu system is configured. Accordingly, unless the scanner's firmware is altered, the system may be limited to a single type of printer. Altering the scanner's firmware is a major undertaking, and a separate alteration must be made for each type of printer to which the scanner is connected.

A problem with the use of copy cards to collect copying fees and restrict the usage of copiers is that the copier must be equipped with a copy card reader, which increases the cost of the copier.

The accounting features of known printers are adapted to charge fees for printing jobs received from a personal computer or server, but not from a scanner. There has accordingly been no accounting procedure for a simplified copying system comprising a printer connected directly to a scanner.

SUMMARY OF THE INVENTION

In a simple copying system comprising a printing apparatus connected to and controlled from an image input apparatus, one object of the present invention is to enable the image input apparatus to adapt to modifications in the features of the printing apparatus without requiring firmware changes.

Another object is to provide the simple copying system with a low-cost accounting function that does not require the use of copy cards.

The invention provides an image input apparatus having an information input unit for input of information other than image information. The image input apparatus is connected to a printing apparatus that operates according to the information input by the information input unit of the image input apparatus. For example, the printing apparatus may have a setting unit for setting printing conditions according to this information.

According to one aspect of the invention, the image input apparatus has an acquisition unit for acquiring, from the printing apparatus, information concerning functions of the printing apparatus, and a display unit for displaying prompts for input of information concerning these functions. Information received by the information input unit in response to the prompts is sent to the printing apparatus, which controls its functions according to the input information. The functions controlled in this way may include hardware functions directly concerned with printing, and an accounting function concerned with printing fees. Since the image input apparatus begins by learning what functions the printing apparatus has from the printing apparatus itself, the image input apparatus can adapt to a variety of different types of printing apparatus.

According to another aspect of the invention, the information input by the information input unit of the image input apparatus includes information identifying a user of the apparatus. The printing apparatus has an accounting function in which the identifying information is used. Copying service may be refused, for example, if the identifying information has not already been registered in the printing apparatus, or in the image input apparatus. If the identifying information has already been registered, fees may be charged according to, for example, the number of pages copied.

BRIEF DESCRIPTION OF THE DRAWINGS

In the attached drawings:

FIG. 1 schematically shows the structure of an image printing system according to a first embodiment of the invention;

FIG. 2 is a block diagram of the scanner in the first embodiment;

FIG. 3 illustrates a printer information table used in the first embodiment;

FIG. 8 illustrates a printer information table used in a second embodiment of the invention;

FIG. 24 illustrates the structure of an account identifier information query command in the fifth embodiment;

FIG. 25 illustrates the structure of a command replying to the command in FIG. 24;

FIG. 26 shows an example of an account identifier information query command in the fifth embodiment;

FIG. 28 shows an example of a reply to the command in FIG. 26;

FIG. 29 shows another example of a reply to the command in FIG. 26; and

DETAILED DESCRIPTION OF THE INVENTION

Figure 4:
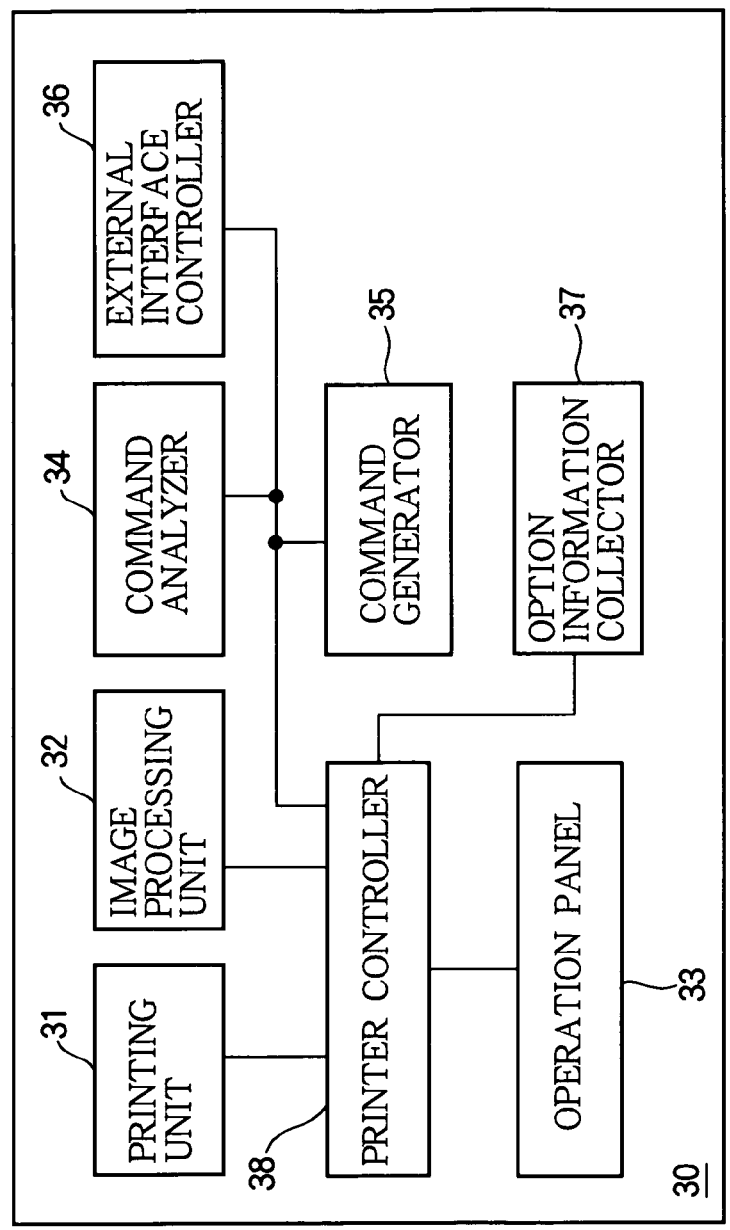
FIG. 4 is a block diagram of the printer in the first embodiment.

Embodiments of the invention will now be described with reference to the attached drawings, in which like elements are indicated by like reference characters.

Referring to FIG. 1, each embodiment that will be described below is an image printing system comprising a scanner 10 connected by a cable 20 to a printer 30. The scanner 10 includes a lamp for illuminating a document, a lens, and an imaging device such as a charge coupled device (CCD) or imaging tube that scans and captures an image of the illuminated document through the lens. The document may be a printed document, a photograph, or any other type of document. The scanner 10 may be any type of scanner, e.g., a flatbed scanner, a sheet-feed scanner, a hand-held scanner, or a drum scanner. The scanner 10 is preferably a color scanner capable of capturing color images, but a monochrome scanner may be used instead. The scanner 10 also includes a computing device such as a central processing unit (CPU) or microprocessor unit (MPU), a memory comprising, for example, one or more semiconductor memory devices, a display unit such as a liquid crystal display (LCD) or light-emitting diode (LED) display, an input unit such as a keypad, pushbutton control panel, or touch panel, and a communication interface.

The printer 30 may be either a monochrome or a color printer and may use any type of image forming method, such as an electrophotographic method, an ink jet method, a wire dot impact method, an ink ribbon method, or a thermal transfer method. The printer 30 also includes a computing device such as a CPU or MPU, a semiconductor memory or other type of memory, a display device such as a liquid crystal display or an LED display, an input unit such as a keypad, pushbutton control panel, or touch panel, and a communication interface.

The cable 20 may be, for example, a so-called Centronics cable conforming to the Institute of Electrical and Electronics Engineers (IEEE) 1284 standard, a universal serial bus (USB) cable conforming to the USB standard, a cable conforming to the IEEE 1394 standard, or a 10/100 Base T cable for a local area network (LAN).

In the copying system in FIG. 1, the scanner 10 scans a document and transmits the resulting image data through the cable 20 to the printer 30, which prints a copy of the document on paper or other printing media.

Next, a first embodiment of the invention will be described in detail with reference to FIGS. 2 to 7.

Referring to FIG. 2, the scanner 10 in the first embodiment comprises a scanning unit 11 for scanning a document to obtain image data, an image processing unit 12 that carries out image processing on the image data, an operation panel 13 on which a copy mode can be specified and copy operations performed, a command analyzer 14 for analyzing commands received from the printer 30, a command generator 15 for generating commands to be sent to the printer 30, an operation panel controller 16 for displaying a copy operation menu according to printing options implemented in the printer 30, an external interface controller 17 for controlling data transfer between the scanner 10 and printer 30 by carrying out a protocol for sending and receiving commands bidirectionally between the scanner 10 and printer 30, a printer information storage unit 18 for storing printer information received from the printer 30, and a scanner controller 19 that controls the overall operation of the scanner 10 by controlling each of the preceding elements 11-18. The operation panel 13 functions as both an information input unit and a display unit; the command analyzer 14 functions as an acquisition unit.

The external interface controller 17 may be adapted for control of any type of interface, including the IEEE 1284 interface, USB interface, IEEE 1394 interface, or a LAN interface, or for two or more types of interfaces.

The printer information storage unit 18 has a printer information table 18a. Referring to FIG. 3, each entry in the printer information table 18a includes an entry number field 25, a printer option name field 26, an option status field 27, and a menu display field 28. The menu display field 28 indicates whether the information in the entry is to be displayed in the scanner's operation menu. The first entry in FIG. 3 indicates that the printer 30 has a double-sided printing option and that this option is to be displayed in the scanner's menu; the second entry indicates that the printer 30 does not have a document binding option and that this option is not to be displayed; the third entry indicates that the printer 30 has a hard disk option and that this option is not to be displayed.

The options in FIG. 3 are all hardware functions, but the options may also include software or firmware functions such as an accounting function.

Referring to FIG. 4, the printer 30 in the first embodiment comprises a printing unit 31 for controlling printing operations, an image processing unit 32 that carries out image processing on image data to be printed, an operation panel 33 on which, for example, settings of the printer 30 can be specified, a command analyzer 34 that functions as an acquisition unit and analyzes commands received from the scanner 10, a command generator 35 for generating commands to be sent to the scanner 10, an external interface controller 36 for controlling data transfer between the scanner 10 and printer 30 by carrying out a protocol, the physical interface of which is not specified, for sending and receiving commands bidirectionally between the scanner 10 and printer 30, an option information collector 37 for collecting information on printer options implemented in the printer 30, and a printer controller 38 that controls the overall operation of the printer 30 by controlling each of the preceding elements 31-37.

Next, the operation of the first embodiment will be described.

First, when the external interface controller 17 of the scanner 10 recognizes that the scanner 10 is connected to the printer 30, the command generator 15 generates a device information acquisition request command and the external interface controller 17 sends it to the printer 30. The command is received by the external interface controller 36 of the printer 30 and analyzed by the command analyzer 34. When the command is recognized as a device information acquisition request command, the option information collector 37 collects information on printer options implemented in the printer 30, on the basis of which the command generator 35 generates a device information command including the information in the printer information table 18a shown in FIG. 3 and sends it to the scanner 10.

When the scanner 10 receives the device information command including the information in the printer information table 18a, the operation panel controller 16 generates an operation menu for the scanner 10. The operation panel controller 16 first checks the menu display field 28 to tell which entries in the printer information table 18a should be displayed in the menu and the option status field 27 to tell which entries indicate implemented options. The menu that will appear on the operation panel 13 is generated in part from the entries that are to be displayed.

When the printer information table 18a shown in FIG. 3 is received, from the first entry the operation panel controller 16 recognizes that the printer 30 implements the first option (double-sided printing), and that this option is to be displayed on the scanner's menu; from the second entry the operation panel controller 16 recognizes that the second option (document binding) is not implemented and need not be displayed; and from the third entry the operation panel controller 16 recognizes that the third option (hard disk) is implemented but need not be displayed. From this and other information, the operation panel controller 16 sets the operation panel 13 to follow the display procedure in FIG. 5, which shows the individual items displayed in the menu on the operation panel 13.

Figure 5:
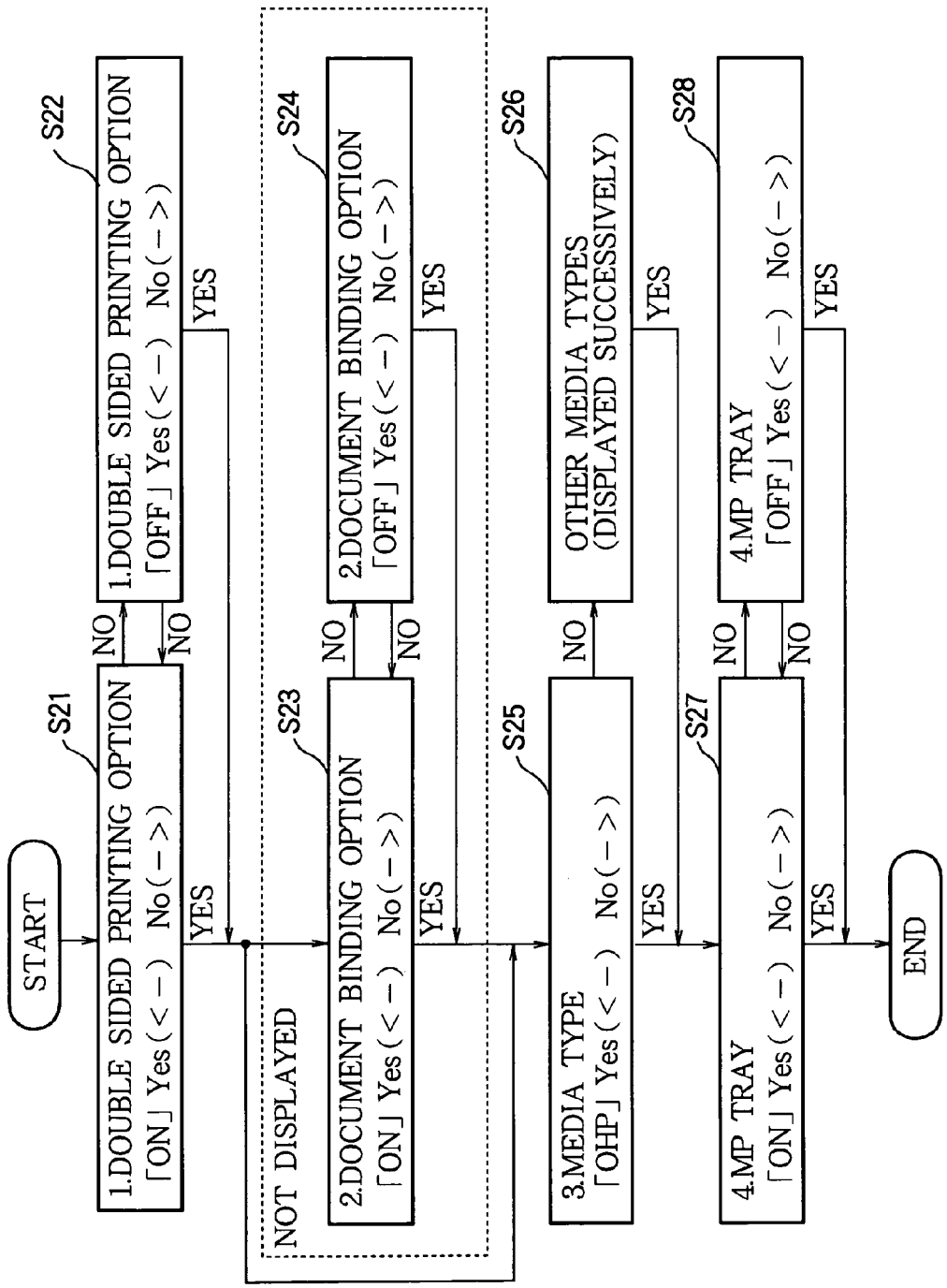
FIG. 5 is a flowchart illustrating the display procedure of the scanner in the first embodiment.

The first option displayed on the scanner's menu (in steps S21 and s22) is the double-sided printing option. The user can choose whether to use this option or not by toggling the setting on or off as shown in FIG. 5. The document binding option (steps S23 and S24) and hard disk option are omitted from the scanner's menu; the next menu item displayed is a printing media setting (steps S25 and S26), followed by a multipurpose (MP) tray specification (steps S27 and S28).

The operator selects the desired options and other settings by operating the operation panel 13 of the scanner 10, and starts the copying operation. The scanning unit 11 captures an image of the document. The command generator 15 of the scanner 10 then generates commands according to the information the operator sets from the menu, and the external interface controller 17 sends the commands together with the image data processed by the image processing unit 12 to the printer 30.

Although the hard disk option (the third entry) is not displayed on the scanner's menu, since it is implemented, the command generator 15 also generates a command that that enables the hard disk option and the external interface controller 17 sends this command to the printer 30.

In the printer 30, the external interface controller 36 receives the image data and the above-described commands, with which the scanner sets up the printing environment. The command analyzer 34 analyzes the commands, the image processing unit 32 performs image processing, and the printing unit 31 carries out printing. As described above, the image printing system according to this embodiment functions as a simplified copy system through cooperation between the scanner 10 and printer 30.

Figure 6:
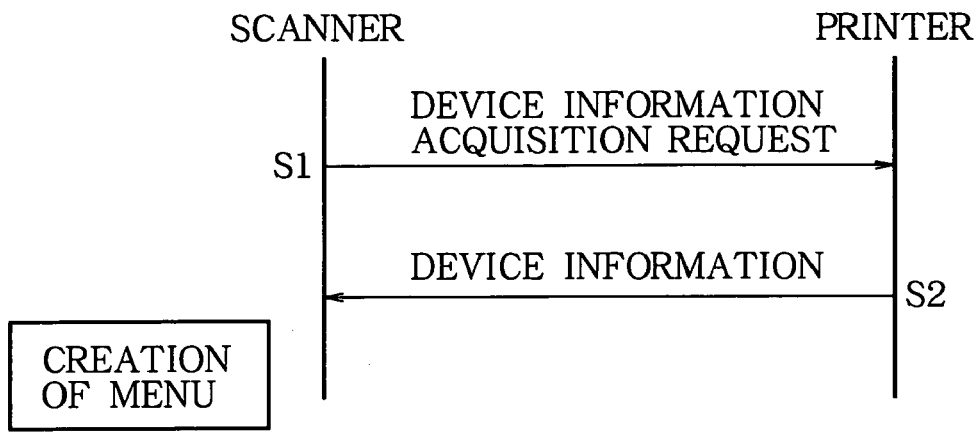
FIG. 6 is a diagram illustrating the acquisition of printer device information in the first embodiment.
Figure 7:
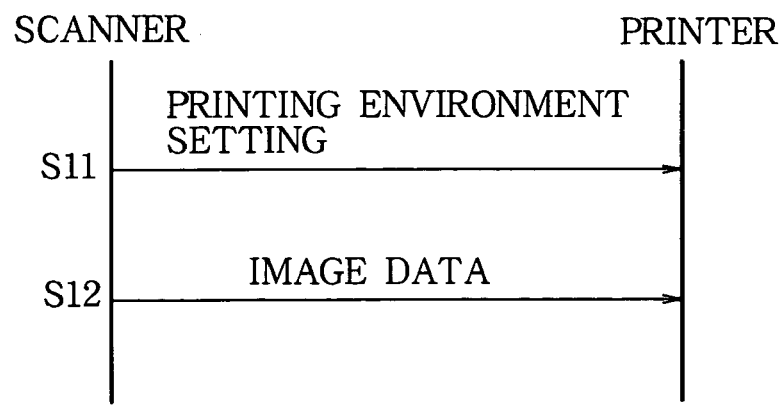
FIG. 7 is a diagram illustrating the setting of the printing environment of the printer in the first embodiment.

The communication procedure between the scanner 10 and printer 30 is illustrated in FIGS. 6 and 7. In step S1 in FIG. 6, the scanner 10 sends a device information acquisition request to the printer 30; in step S2 the printer 30 returns device information to the scanner 10. In step S11 in FIG. 7, the scanner 10 sends printer environment setting information to the printer 30; in step S12 the scanner 10 sends image data to the printer 30.

The procedure for displaying the scanner's menu is illustrated in FIG. 5.

In step S21, the double-sided printing option is indicated to be enabled (on), and the operator is given an opportunity to turn it off. If the operator presses a 'Yes' key (in this case, a left arrow key) on the printer 30 to leave the double-sided printing option on, the menu display proceeds to the next setting. If the operator presses a 'No' key (a right arrow key) to turn the double-sided printing option off, the menu display proceeds to step S22.

In step S22, the double-sided printing option is indicated to be off, and the operator is given an opportunity to turn it back on. If the operator presses the 'Yes' key to leave the double-sided printing option turned off, the menu display proceeds to the next setting. If the operator presses the 'No' key to turn the double-sided printing option back on, the menu display returns to step S21.

The next steps (S23 and S24) are skipped because the document binding option is not displayed.

In step S25, the media type is indicated to be OHP (overhead projector film). If the operator presses the 'Yes' key to select this setting, the menu display proceeds to the tray setting (step S27). If the operator presses the 'No' key, the menu proceeds to display other media types, continuing until the 'Yes' key is pressed and then proceeding to step S27.

In step S27, the multi-purpose (MP) tray selection is indicated to be turned on. If the operator presses the 'Yes' key, the procedure ends with the MP tray selected. If the operator presses the 'No' key, the menu display proceeds to step S28, in which the MP tray selection is indicated to be turned off. The operator can press the 'Yes' key to end the procedure with the MP tray not selected, or can press the 'No' key to return to step S27.

As described above, the scanner 10 and printer 30 in this embodiment have external interface controllers 17 and 36, respectively, for carrying out a bidirectional protocol for sending and receiving commands and transferring data. The scanner 10 requests device information from the printer 30. The menu settings of the scanner 10 are generated in part from the information obtained in reply. Accordingly, even if the options of the printer 30 are changed, it is not necessary to change the firmware of the scanner 10. When options are added to the printer 30, they can be enabled and disabled by settings made from the scanner 10. If some options are removed from the printer 30, it is not necessary for the scanner 10 to present them on its menu and send meaningless option selection commands to the printer 30. The image printing system can thereby be improved and made more convenient to use.

Next, a second embodiment of the invention will be described with reference to FIGS. 8 to 11.

FIG. 8 illustrates a printer information table used in the second embodiment of the invention.

The scanner 10 in the second embodiment has the same hardware configuration as in the first embodiment, so only the printer information table 18a will be described, omitting descriptions of the other parts of the scanner 10. As shown in FIG. 8, a fourth printer option is listed in the printer information table 18a, indicating that an accounting option is implemented in the printer 30 and is not to be displayed.

Figure 9:
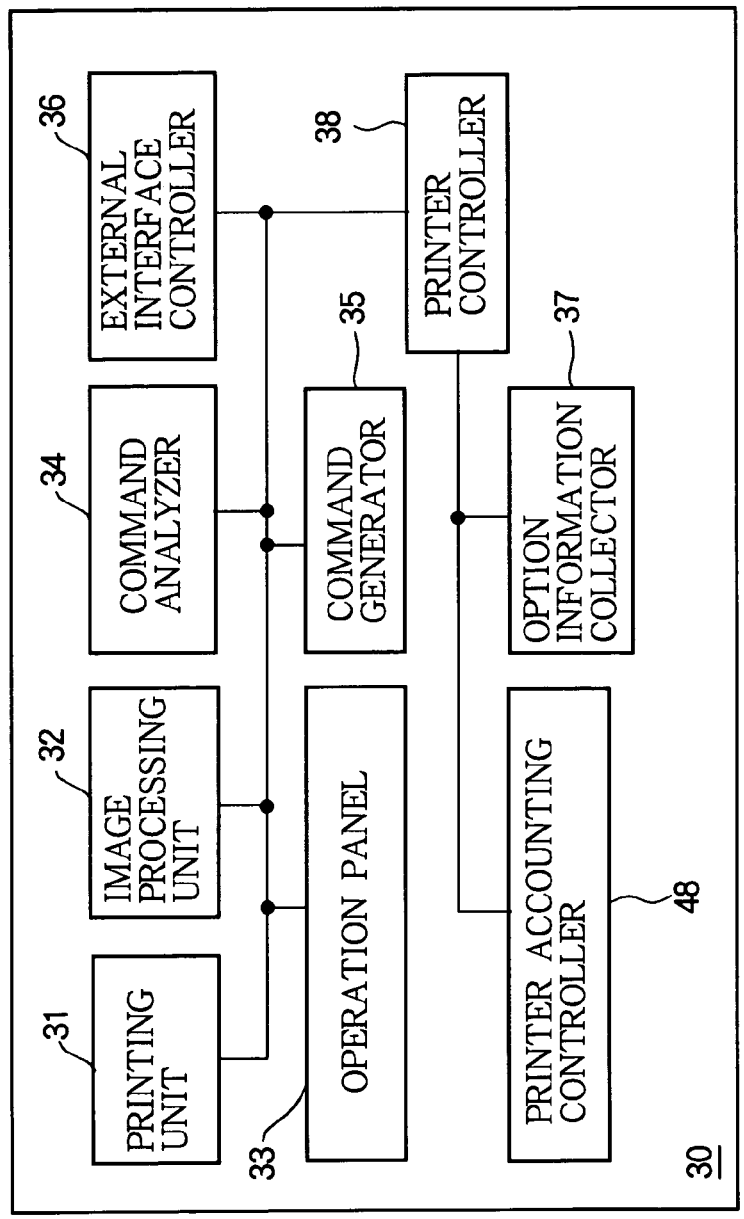
FIG. 9 is a block diagram of the printer in the second embodiment.

Next, the printer 30 in the second embodiment will be described with reference to the block diagram in FIG. 9. The printer 30 in the second embodiment adds a printer accounting controller 48 to the printer of the first embodiment. The printer accounting controller 48 has functions for charging copying fees and restricting copying according to the data contents of accounting commands sent from the scanner 10. The printer accounting controller 48 can also be used for charging fees and restricting the printing of image data received from computer terminals such as personal computers and servers, which are connected through a network (not shown) to the printer 30. If the printer 30 is set to prohibit printing of image data received from the scanner 10 or a computer terminal, the printer accounting controller 48 controls the printer 30 so as not to print the image data.

Next, the accounting command structure in the second embodiment will be described with reference to FIG. 10, which illustrates the data structure of the accounting command, and FIG. 11, which illustrates an accounting command with fixed values.

Figure 10:
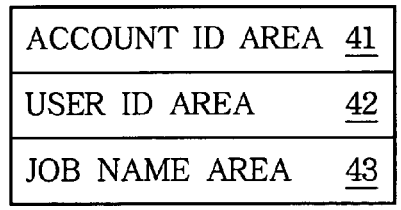
FIG. 10 illustrates the data structure of an accounting command in the second embodiment.

As shown in FIG. 10, the accounting command has an account identifier (ID) area 41, a user ID area 42, and a job name area 43. If the accounting option is turned on but is not displayed in the scanner's menu, as shown in FIG. 8, the accounting command is sent from the scanner 10 to the printer 30 with fixed values, preset in the scanner 10, in the account ID area 41, user ID area 42, and job name area 43. If the accounting option is turned on and is to be displayed in the menu, the menu is configured to let the operator input the user ID on the operation panel 13 of the scanner 10, and the input data are sent to the printer 30 in the user ID area 42.

Figure 11:
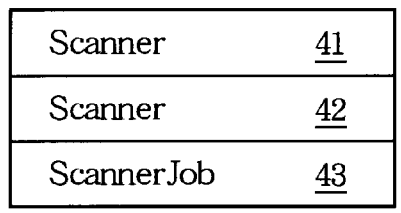
FIG. 11 illustrates an accounting command with fixed contents.

As shown in FIG. 11, the fixed data in the account ID area 41 is the scanner's name or identifier, such as 'Scanner', the fixed data in the user ID area 42 is also the scanner's name or identifier, and the fixed data in the job name area 43 is a fixed job name, such as 'ScannerJob'.

Next, the operation of the image printing system in the second embodiment will be described.

First, as in the first embodiment, the scanner 10 acquires the printer information table 18a from the printer 30, and stores it in the printer information storage unit 18. The printer information table 18a in the second embodiment includes accounting option information. If the printer information table 18a indicates that the accounting option is turned on but is not to be displayed in the scanner's menu, the image printing system operates as follows:

The operator operates the operation panel 13 of the scanner 10 to start the copying operation, and the scanning unit 11 captures an image of the document as in the first embodiment. The image processing unit 12 processes the image data, and the command generator 15 generates commands according to the information set from the menu. An accounting command having the fixed data shown in FIG. 11 is then generated and sent to the printer 30. The printer 30 now operates differently depending on whether printing of the data received from the scanner 10 is prohibited or not. If printing is prohibited, it is not performed. Otherwise, a copying fee is charged by, for example, counting the number of copied pages printed. Accounting information, such as, for example, the counted number of printed pages is stored in the printer accounting controller 48, related to the scanner name used as an account ID.

If the printer information table 18a indicates that the accounting option is turned on and is to be displayed in the menu, a menu item prompting for input of a user ID is displayed on the operation panel 13 of the scanner 10. By operating the operation panel 13, the operator enters a user ID, which is placed in an accounting command and sent to the printer 30. If the user ID in the received accounting command coincides with one of the registered user IDs, the printer 30 performs printing and charges a copying fee; if not, printing is not performed. To charge a copying fee, the number of pages printed is counted and stored as accounting information related, in this case, to the scanner name used as an account ID.

As described above, in this embodiment, the scanner 10 decides whether to prompt for input of a user ID depending on how the accounting option is implemented in the printer 30. The scanner 10 sends an accounting command to the printer 30, and the printer 30 charges a copying fee or restricts usage according to the received accounting command. The image printing system can thereby manage copying fees and restrict usage to authorized users at a low cost and without using copy cards.

Next, a third embodiment of the invention will be described.

Figure 12:
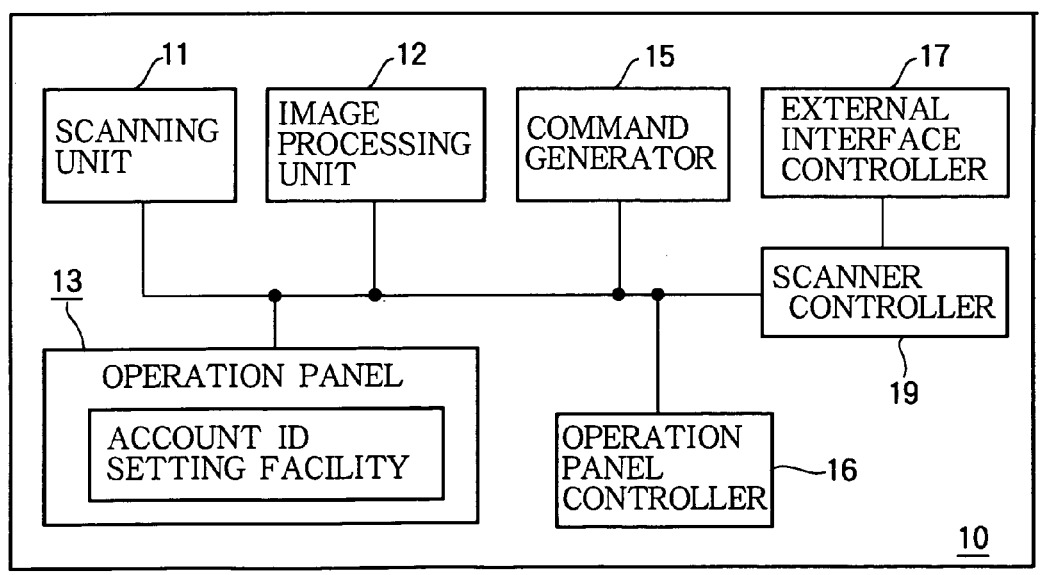
FIG. 12 is a block diagram of the scanner in a third embodiment of the invention.

First, the scanner 10 in the third embodiment will be described with reference to the block diagram in FIG. 12. The scanner 10 in this embodiment is similar to the scanner 10 in the first embodiment, shown in FIG. 2, except that the operation panel 13 has an account ID setting facility 13a, and there is no command analyzer 14 or printer information storage unit 18. The account ID setting facility 13a may be any type of facility having an on state and an off state, such as a pushbutton switch.

Figure 13:
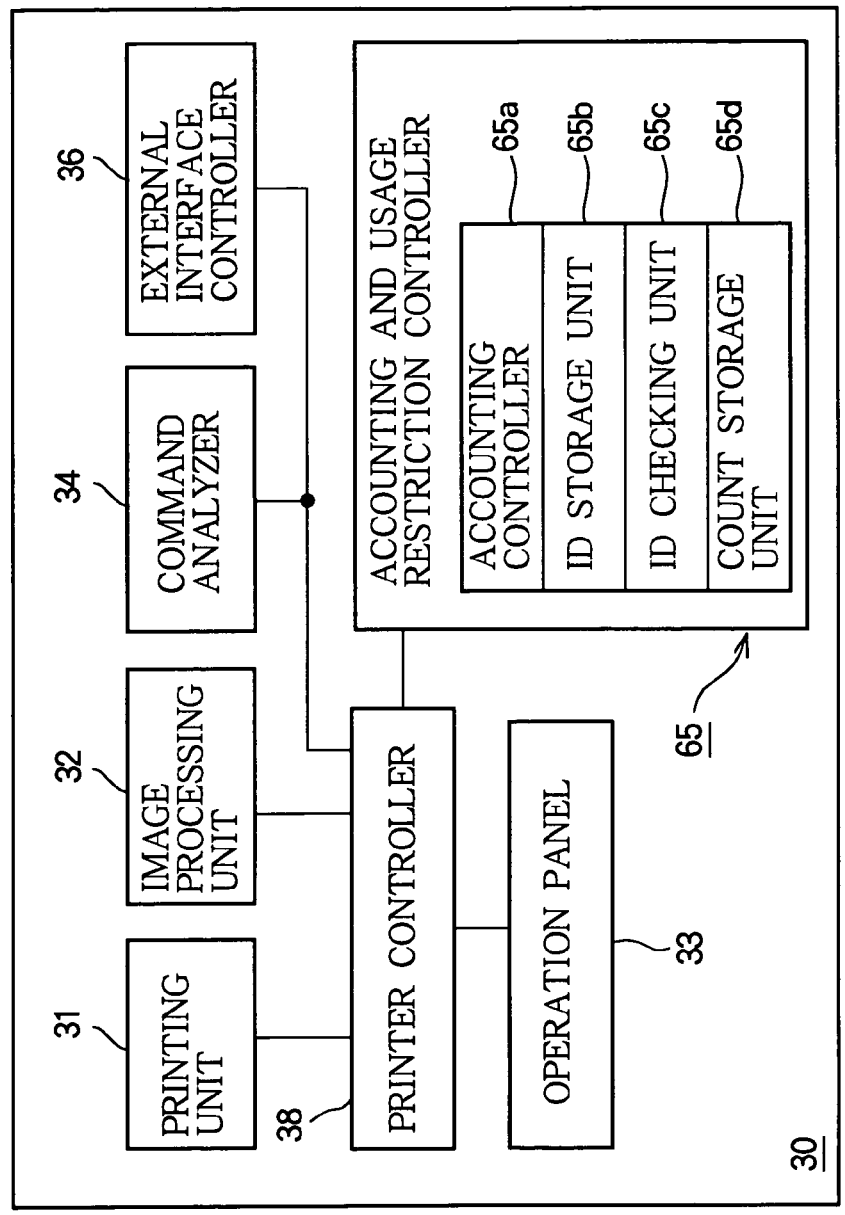
FIG. 13 is a block diagram of the printer in the third embodiment.

Next, the printer 30 in the third embodiment will be described with reference to the block diagram in FIG. 13. The printer 30 in this embodiment is similar to the printer 30 in the first embodiment, shown in FIG. 4, except that instead of a command generator 35 and option information collector 37, it has an accounting and usage restriction controller 65. The accounting and usage restriction controller 65 comprises an accounting controller 65a for counting numbers of pages printed and calculating printing fees, an ID storage unit 65b for storing account IDs used for charging fees and restricting usage of the printer 30, an ID checking unit 65c for checking whether an account ID sent from the scanner 10 coincides with one of the account IDs stored in the ID storage unit 65b, and a count storage unit 65d for storing data indicating numbers of pages printed, as accounting information.

The data structure of the accounting command in this embodiment is identical to that in the second embodiment, comprising an account ID area 41, user ID area 42, and job name area 43 as shown in FIG. 10. When the account ID setting facility 13a in the operation panel 13 of the scanner 10 is set to the off state, the scanner's identifier is set in the account ID area 41 and user ID area 42 and a fixed job name is set in the job name area 43, as shown in FIG. 11, and this information is sent to the printer 30.

To use the printer's accounting and restriction features, the operation panel 13 is operated to set the account ID setting facility 13a in the scanner 10 to the on state. The scanner's menu is then configured to let the operator input an account ID on the operation panel 13 of the scanner 10. The input ID is then placed in the account ID area 41 of an accounting command by the command generator 15, and sent to the printer 30.

The accounting and usage restriction controller 65 of the printer 30 can also be used for charging fees and restricting usage when data to be printed are received from computer terminals such as personal computers and servers, which are connected through a network (not shown) to the printer 30. If the printer 30 is set to prohibit printing of the image data received from the scanner 10 or computer terminals, the accounting and usage restriction controller 65 controls the printer 30 so as not to print the image data.

Next, the operation of the third embodiment will be described.

When the account ID setting facility 13a in the scanner 10 is turned off, the operator operates the operation panel 13 of the scanner 10 to start the copying operation, and the scanning unit 11 captures an image of the document as in the first embodiment. The image processing unit 12 processes the image data, and the command generator 15 of the scanner 10 generates commands according to the information set in the menu. An accounting command having the fixed data shown in FIG. 11 is generated and sent to the printer 30.

The printer 30 now operates differently depending on whether printing of the data received from the scanner 10 is prohibited or not. If printing is prohibited, it is not performed. Otherwise, a copying fee is charged by, for example, counting the number of copied pages printed. Accounting information, which is, for example, the counted number of printed pages, is stored into the count storage unit 65d in the accounting and usage restriction controller 65 of the printer 30, wherein the accounting information is related to the account ID.

When the account ID setting facility 13a of the scanner 10 is turned on, a menu item prompting for input of an account ID is displayed on the operation panel 13 of the scanner 10. The operator operates the operation panel 13 and enters the account ID, which is placed in an accounting command and sent to the printer 30.

Figure 14:
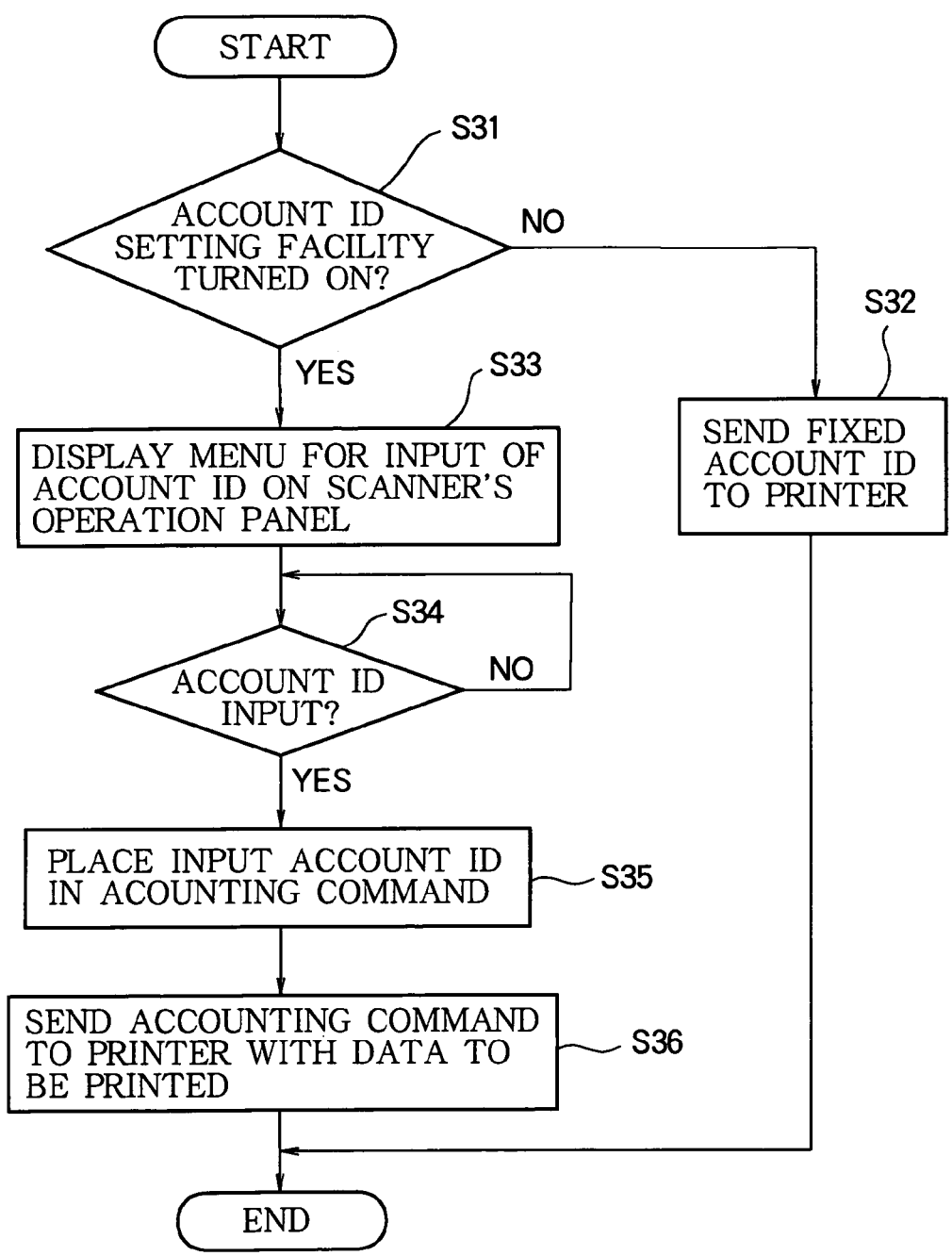
FIG. 14 is a flowchart illustrating the operation of the scanner in the third embodiment.

The scanner 10 operates according to the process illustrated in the flowchart in FIG. 14. In step S31, the account ID setting facility 13a is checked to see whether it is turned on or not. If the account ID setting facility 13a is turned off, data including a fixed account ID are sent to the printer 30 in step S32 and the process terminates. If the account ID setting facility 13a is turned on, a menu item prompting for input of an account ID is displayed on the operation panel 13 of the scanner 10 in step S33. In step S34 processing waits for input of an account ID. When the account ID is input, it is placed in the accounting command in step S35. In step S36, the accounting command is sent to the printer 30 together with the data to be printed, and the process terminates.

Upon receiving the accounting command and data to be printed, the printer 30 operates as follows. First, the ID checking unit 65c in the accounting and usage restriction controller 65 checks the received account ID. The account IDs stored in the ID storage unit 65b may include IDs sent from computer terminals such as personal computers and servers, which are connected through a network (not shown) to the printer 30, and IDs sent from the scanner 10 when an account ID is registered at the scanner 10. If the received account ID does not coincide with one of the account IDs already stored in the ID storage unit 65b, printing is not performed. If the received account ID coincides with one of the account IDs already stored in the ID storage unit 65b, the printer 30 performs printing and charges a copying fee by, for example, counting the number of pages printed and storing the number in the count storage unit 65d together with the received account ID as accounting information.

Figure 15:
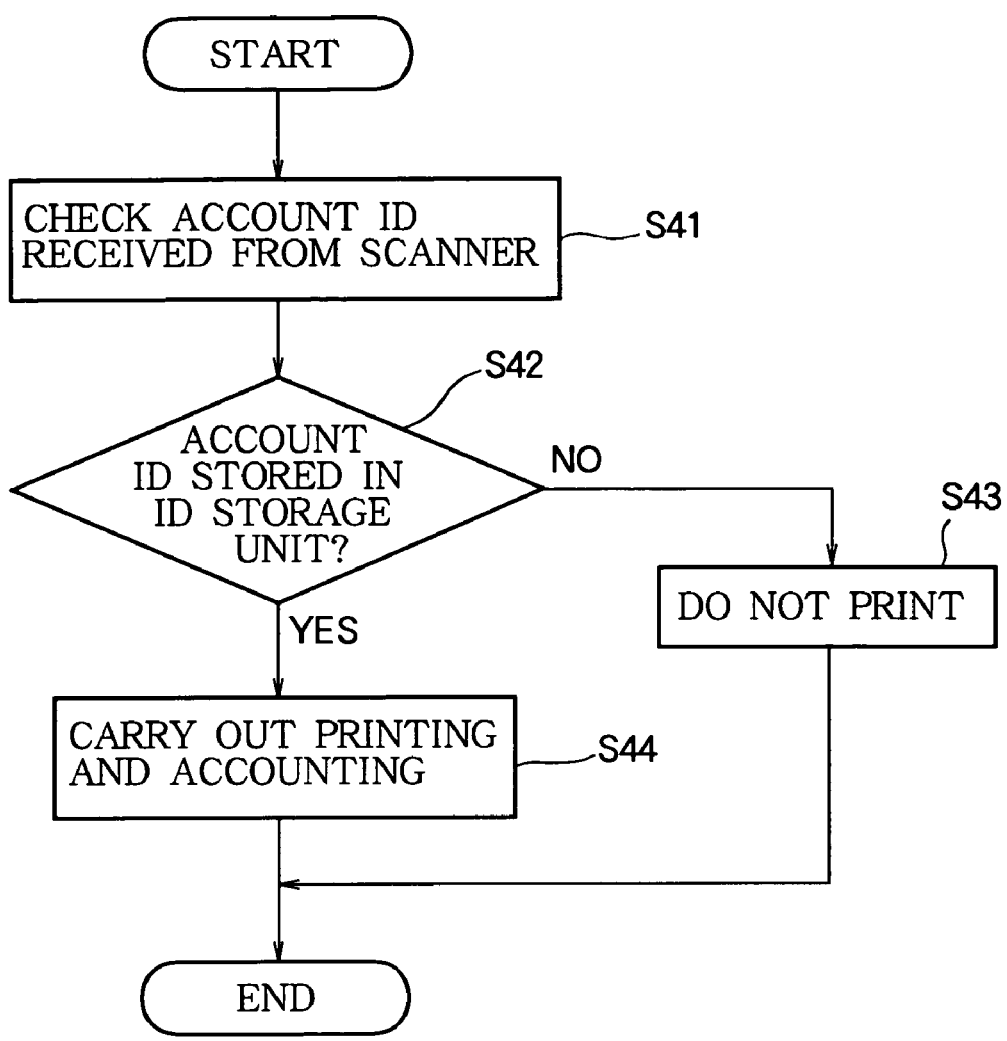
FIG. 15 is a flowchart illustrating the operation of the printer in the third embodiment.

This procedure is illustrated in the flowchart in FIG. 15. The ID checking unit 65c compares the account ID sent from the scanner 10 with the IDs stored in the ID storage unit 65b (step S41) to decide whether the account ID is already stored in the ID storage unit 65b or not (step S42). If the account ID is not stored in the ID storage unit 65b, printing is not carried out (step S43) and the process terminates. If the account ID is stored in the ID storage unit 65b, printing and accounting operations are carried out (step S44), and the process terminates.

As described above, in the third embodiment, a prompt for input of an account ID is displayed on the operation panel 13 of the scanner 10, and an accounting command including the input account ID is sent from the scanner 10 to the printer 30. The printer 30 charges a copying fee or restricts usage according to the received accounting command. The third embodiment can thereby manage copying fees and restrict usage to authorized users at a low cost, without using copy cards or copy card readers.

Since the printer 30 decides whether to perform printing or not after the scanner 10 captures an image of the document and sends the image data to the printer 30, it is not necessary for the scanner 10 to manage account IDs. Even though the user operates the image printing system in the third embodiment from the scanner 10, the scanner 10 does not have to be equipped with any special features for managing individual user accounts.

Next, a fourth embodiment of the invention will be described.

Figure 16:
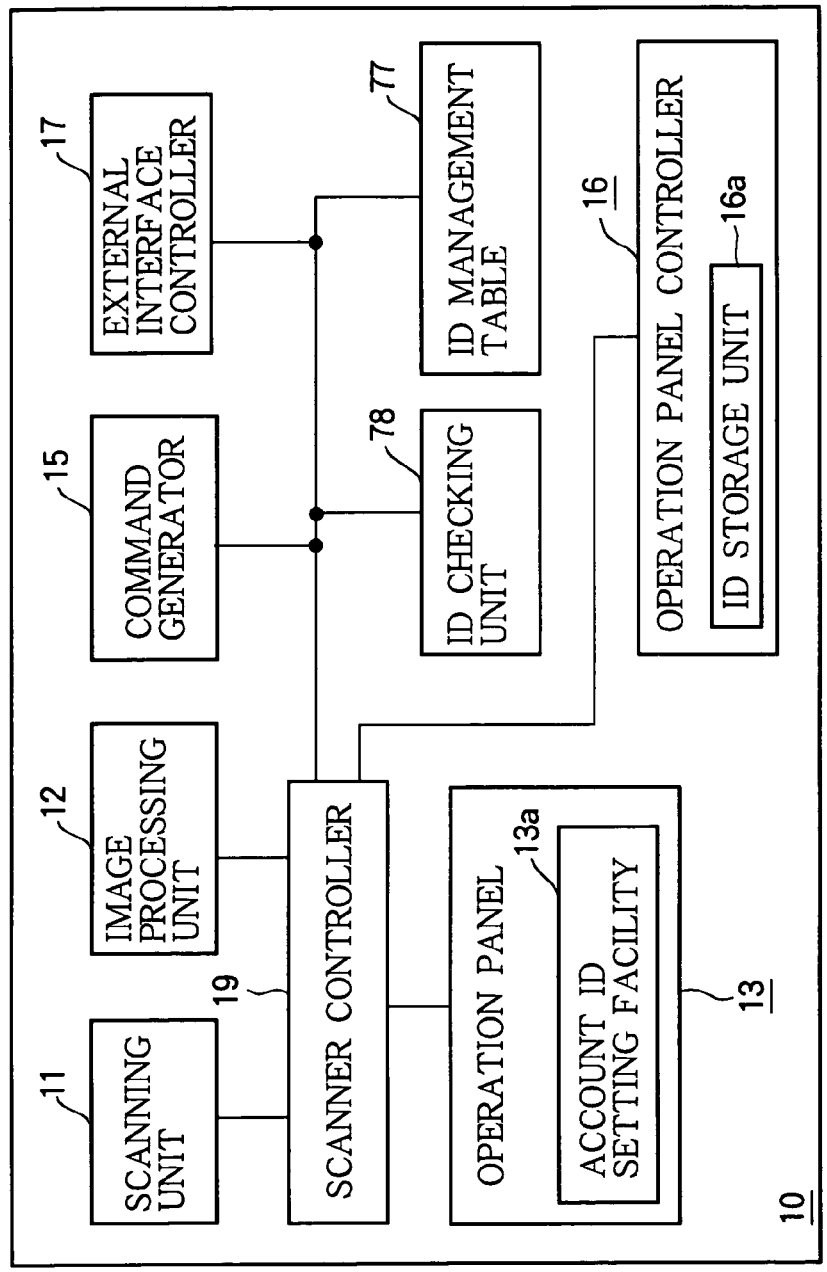
FIG. 16 is a block diagram of the scanner in a fourth embodiment of the invention.

First, the scanner 10 in the fourth embodiment will be described with reference to the block diagram in FIG. 16. The scanner 10 in the fourth embodiment is similar to the scanner in the first embodiment, except that the operation panel controller 16 has an ID registration unit 16a for registering IDs, and the command analyzer and printer information storage unit are replaced by an ID management table 77 for storing the IDs registered by the ID registration unit 16a, and an ID checking unit 78 for checking IDs.

Figure 17:
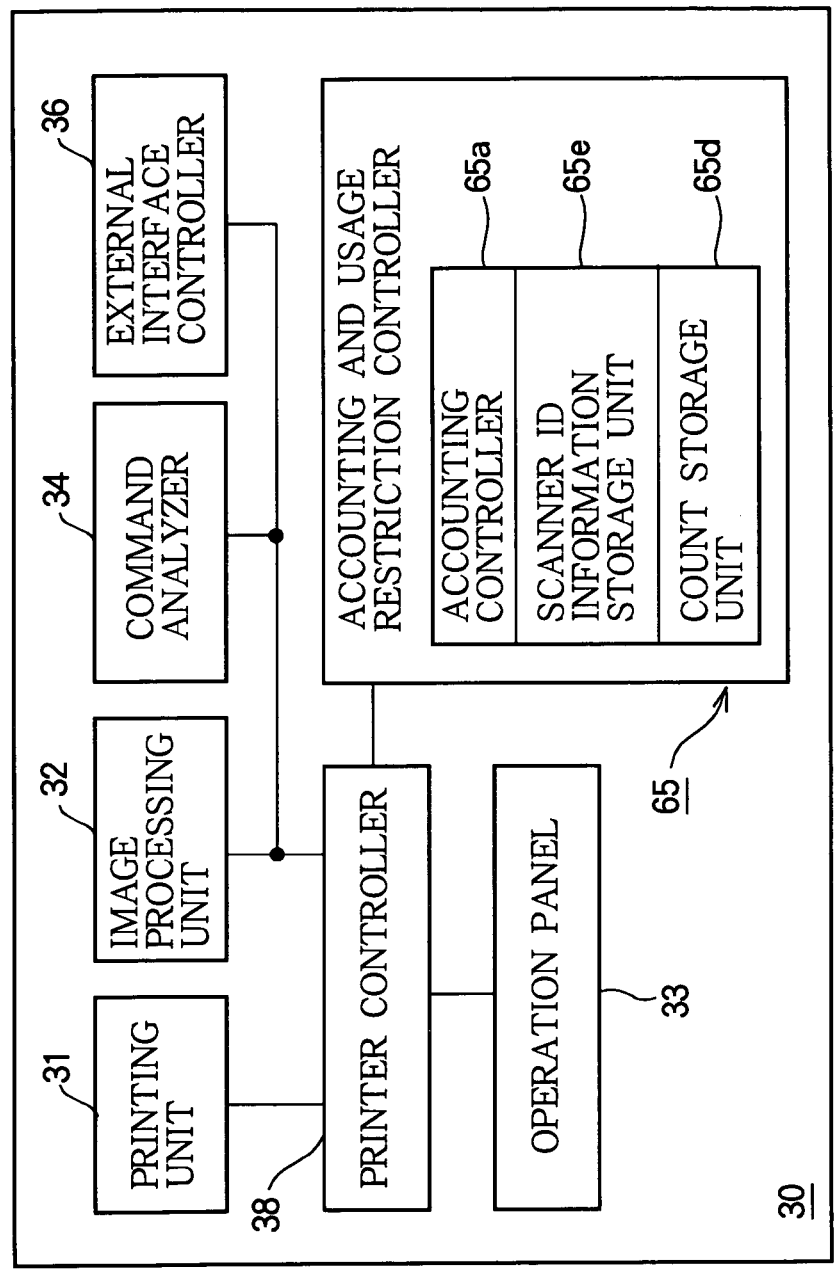
FIG. 17 is a block diagram of the printer in the fourth embodiment.

Next, the printer 30 in the fourth embodiment will be described with reference to the block diagram in FIG. 17. The printer 30 in the fourth embodiment is similar to the printer in the first embodiment except that the command generator and option information collector are replaced by an accounting and usage restriction controller 65. The accounting and usage restriction controller 65 has an accounting controller 65a and count storage unit 65d as described in the third embodiment, and a scanner ID information storage unit 65e for storing the same IDs as stored in the ID management table 77 of the scanner 10. The accounting and usage restriction controller 65 in the fourth embodiment does not have the ID storage unit and ID checking unit shown in the third embodiment.

Next, the operation of the image printing system having the above-described configuration will be described.

First, the procedure for entering account ID information in the scanner 10 will be described. This procedure begins with the display of a menu item prompting for input of an account ID on the operation panel 13 of the scanner 10. The ID registration unit 16a in the operation panel controller 16 of the scanner 10 carries out a registration operation to store the input account ID in the ID management table 77. The command generator 15 then generates an accounting command data packet including the account ID information, and the external interface controller 17 transmits the data packet through the cable 20 to the printer 30.

Figure 18:
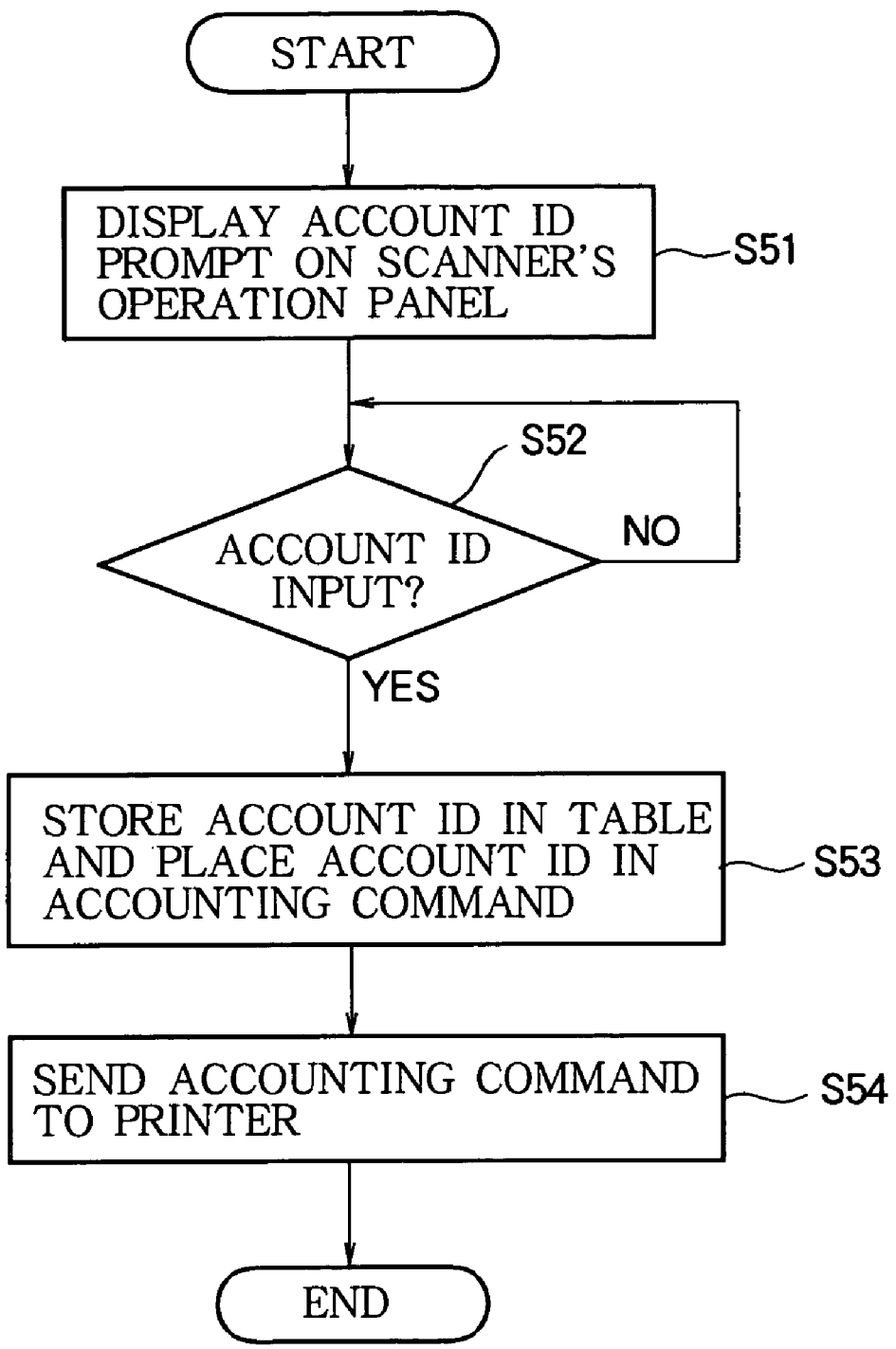
FIG. 18 is a flowchart illustrating the entry of account identifier information in the scanner in the fourth embodiment.

This procedure is illustrated by the flowchart in FIG. 18. In step S51, the menu item prompting for input of an account ID is displayed on the operation panel 13 of the scanner 10. In step S52, the procedure waits for input of an account ID. When the account ID is input, it is registered by storing it in the ID management table 77 in step S53, and the registered account ID is placed in an accounting command. In step S54, the accounting command is sent to the printer 30 and the process terminates.

Next, the copying and storing of scanner ID information in the printer 30 will be described. First, the command analyzer 34 in the printer 30, under the control of the external interface controller 36, receives the data packet including account ID information sent from the scanner 10. After the command analyzer 34 recognizes that the received data packet includes account ID information, the scanner ID information storage unit 65e stores the account ID.

Figure 19:
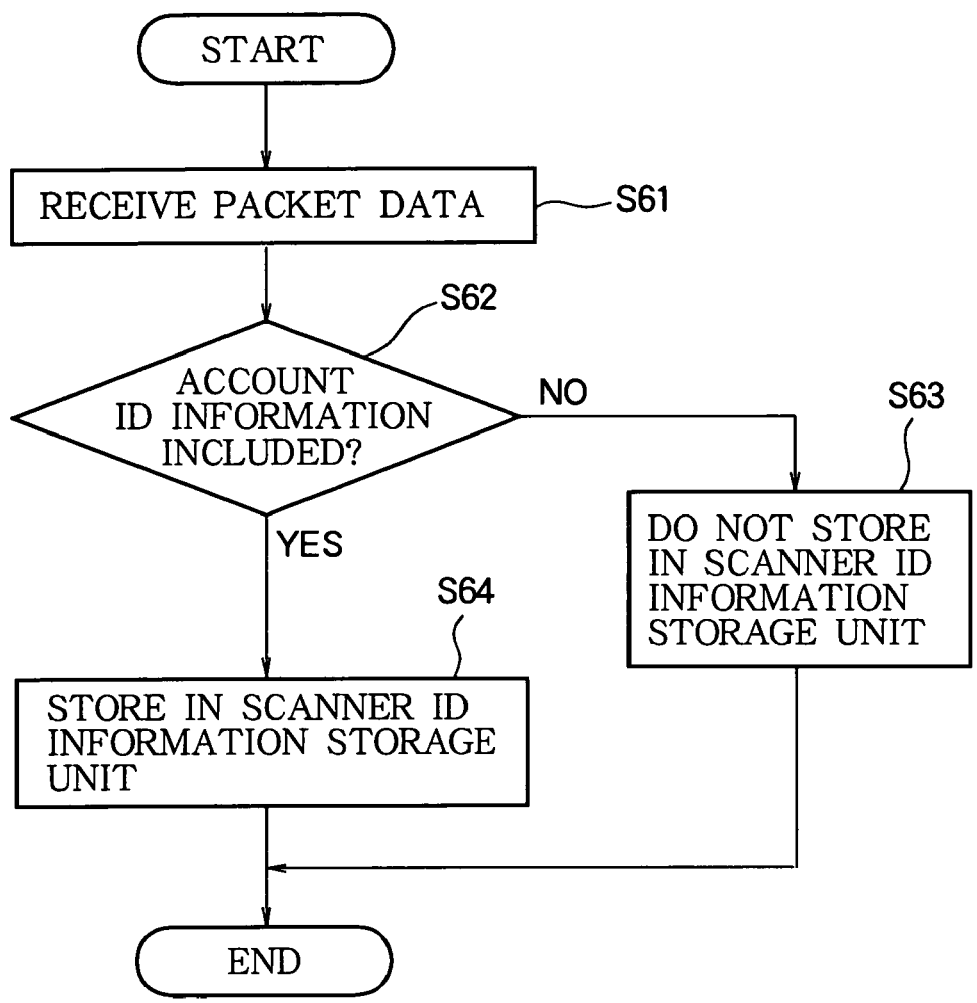
FIG. 19 is a flowchart illustrating the copying of identification information from the scanner to the printer in the fourth embodiment.

This procedure is illustrated in the flowchart in FIG. 19. In step S61, the printer 30 receives a data packet. In step S62, the command analyzer 34 decides whether the data packet includes account ID information or not. If account ID information is not included it is not stored in the scanner ID information storage unit 65e (step S63), and the process terminates. If account ID information is included, it is stored in the scanner ID information storage unit 65e (step S64) and the process terminates.

Next, the copying operation performed by the scanner 10 in the fourth embodiment will be described.

When the account ID setting facility 13a in the scanner 10 is turned off, the operator operates the operation panel 13 of the scanner 10 to start the copying operation, and the scanning unit 11 captures an image of the document. The image processing unit 12 processes the image data, and the command generator 15 of the scanner 10 generates commands, including an accounting command having the fixed data shown in FIG. 11, which is sent to the printer 30.

The printer 30 now operates differently depending on whether printing of the data received from the scanner 10 is prohibited or not. If printing is prohibited, it is not performed. Otherwise, printing is performed and a copying fee is charged by, for example, counting the number of copied pages printed. The counted number of printed pages, for example, is stored in the count storage unit 65d in the printer's accounting and usage restriction controller 65 as accounting information, associated with the scanner's name as an account ID.

If the account ID setting facility 13a of the scanner 10 is turned on, a menu item prompting for input of an account ID is displayed on the operation panel 13 of the scanner 10. The operator operates the operation panel 13 and inputs an account ID, and the ID checking unit 78 determines whether the input account ID is stored in the ID management table 77 or not.

If the input account ID coincides with an ID stored in the ID management table 77, the scanner 10 scans the document to be copied and the command generator 15 generates a data packet with the accounting command shown in FIG. 10, including the input account ID information. Under the control of the external interface controller 17, the data packet is sent to the printer 30 together with the data to be printed. The printer 30 then prints a copy of the scanned document.

If the input account ID does not coincide with an ID stored in the ID management table 77, the copying operation does not start and a message is displayed on the operation panel 13, indicating that the printer cannot be used because the input account ID is not registered.

Figure 20:
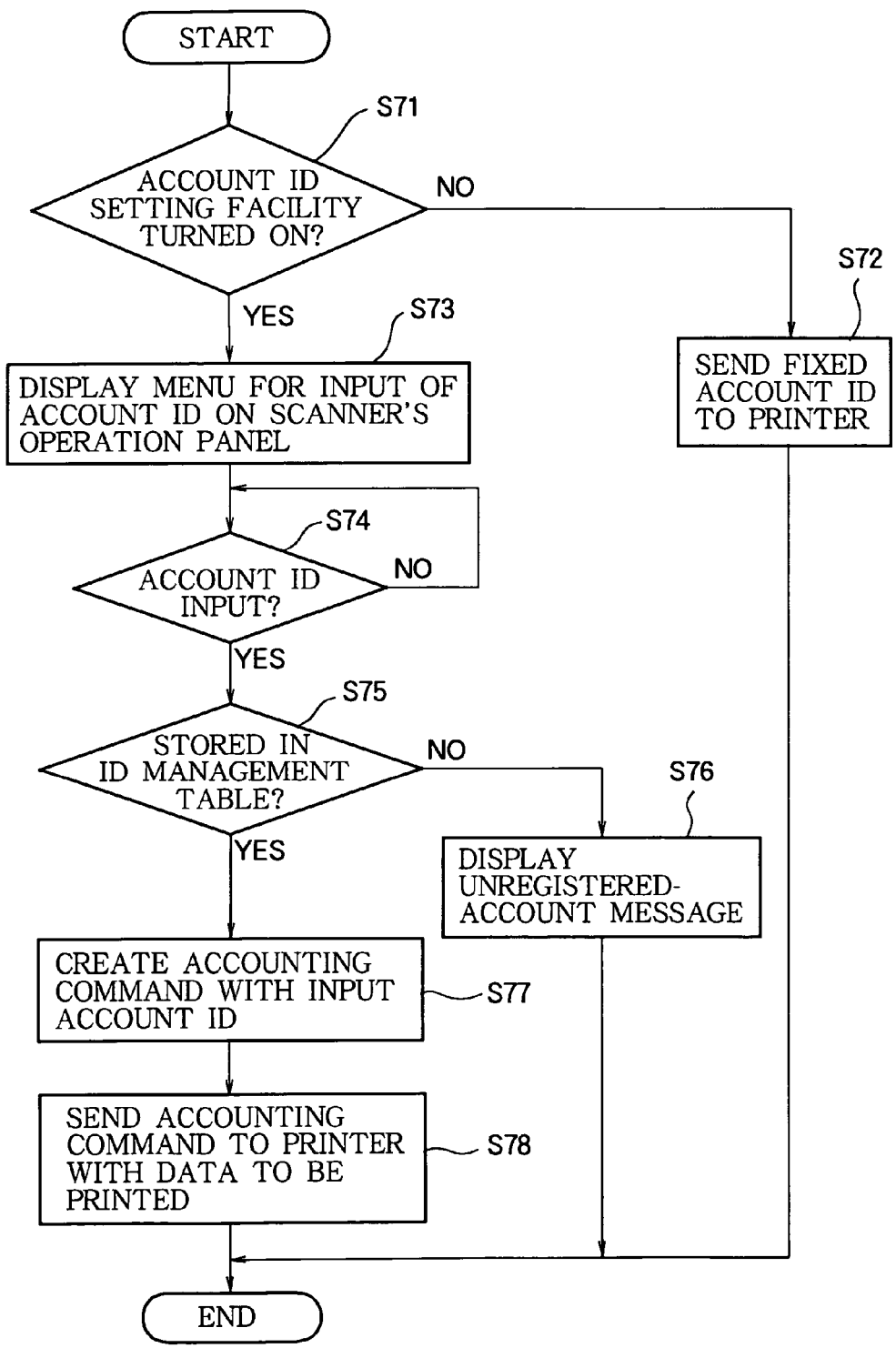
FIG. 20 is a flowchart illustrating the operation of the scanner in the fourth embodiment.

This procedure is illustrated by the flowchart in FIG. 20. In step S71, the account ID setting facility 13a is turned to see whether it is turned on or off. If the account ID setting facility 13a is turned off, data including a fixed account ID are sent to the printer 30 in step S72 and the process terminates. If the account ID setting facility 13a is turned on, a prompt for input of an account ID is displayed on the operation panel 13 of the scanner 10 in step S73. In step S74 processing waits for input of an account ID. When the account ID is input, in step S75 the operation panel controller 16 determines whether the input account ID is stored in the ID management table 77 or not. If the input account ID is not stored in the ID management table 77, then a message is displayed in step S76, indicating that the account ID is not registered, and the process terminates. If the input account ID is stored in the ID management table 77, then the command generator 15 generates an accounting command including the input account ID in step S77. In step S78, the accounting command is sent to the printer 30 together with the data to be printed, and the process terminates.

Next, the operation of the printer 30 will be described.

Figure 21:
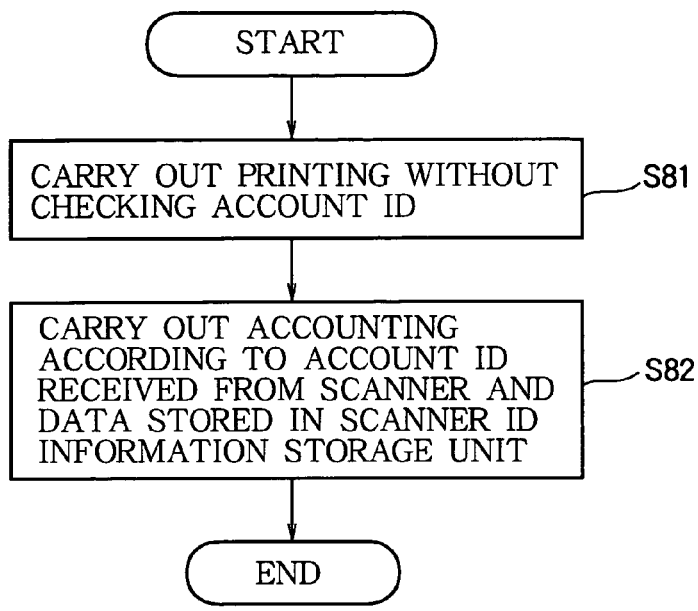
FIG. 21 is a flowchart illustrating the operation of the printer in the fourth embodiment.

In this embodiment, the printer 30 prints received data without checking the account ID received from the scanner 10, and manages accounts on the basis of that account ID and the data stored in the scanner ID information storage unit 65e. The procedure is illustrated in the flowchart in FIG. 21.

In step S81, the printer 30 carries out printing without performing an account ID check. In step S82, the printer 30 uses the account ID received from the scanner 10 and the data stored in the scanner ID information storage unit 65e to update its accounting information, and the process terminates.

Like the third embodiment, the fourth embodiment can manage copying fees and restrict usage at a low cost, without using copy cards. In the third embodiment, since the input account ID is not checked in the scanner 10, the operator cannot immediately tell whether printing is allowed or not. When printing is not allowed, the operator learns this from, for example, a warning indication displayed on the printer 30. In contrast, in the fourth embodiment, the operator can immediately tell whether printing is allowed or not, so the system is more convenient for the operator to use.

Next, a fifth embodiment of the invention will be described.

Figure 22:
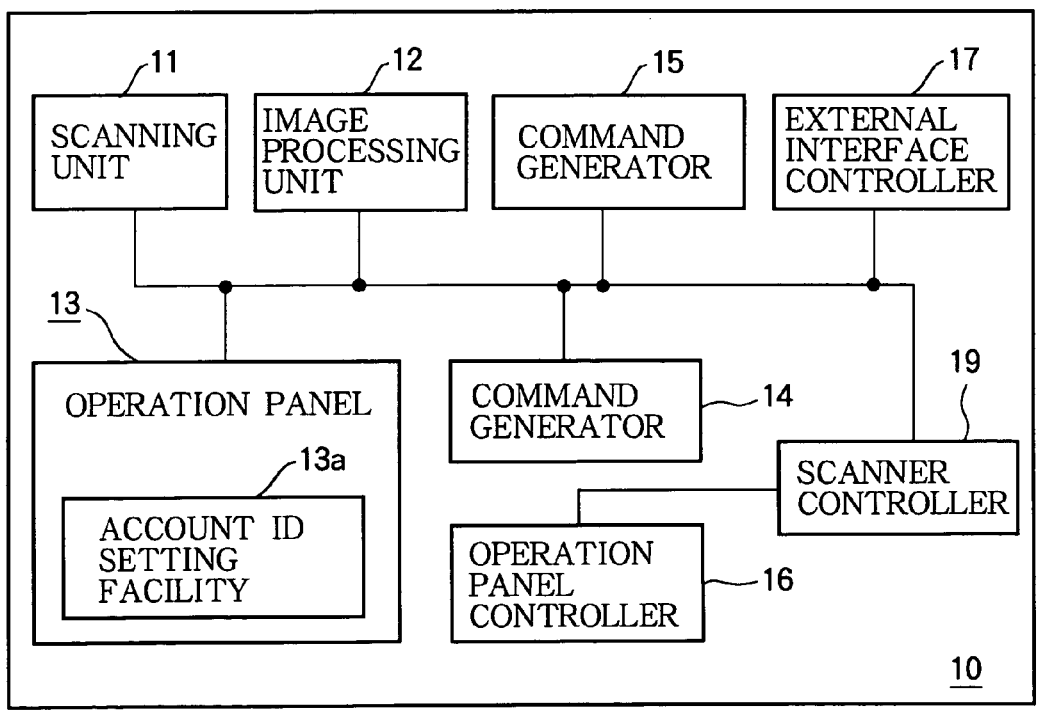
FIG. 22 is a block diagram of the scanner in a fifth embodiment of the invention.

First, the scanner 10 in the fifth embodiment will be described. As shown in the block diagram in FIG. 22, the scanner 10 in the fifth embodiment is similar to the scanner 10 in the fourth embodiment, except that the operation panel controller 16 does not have an ID registration unit, and the ID management table and ID checking unit are eliminated.

Figure 23:
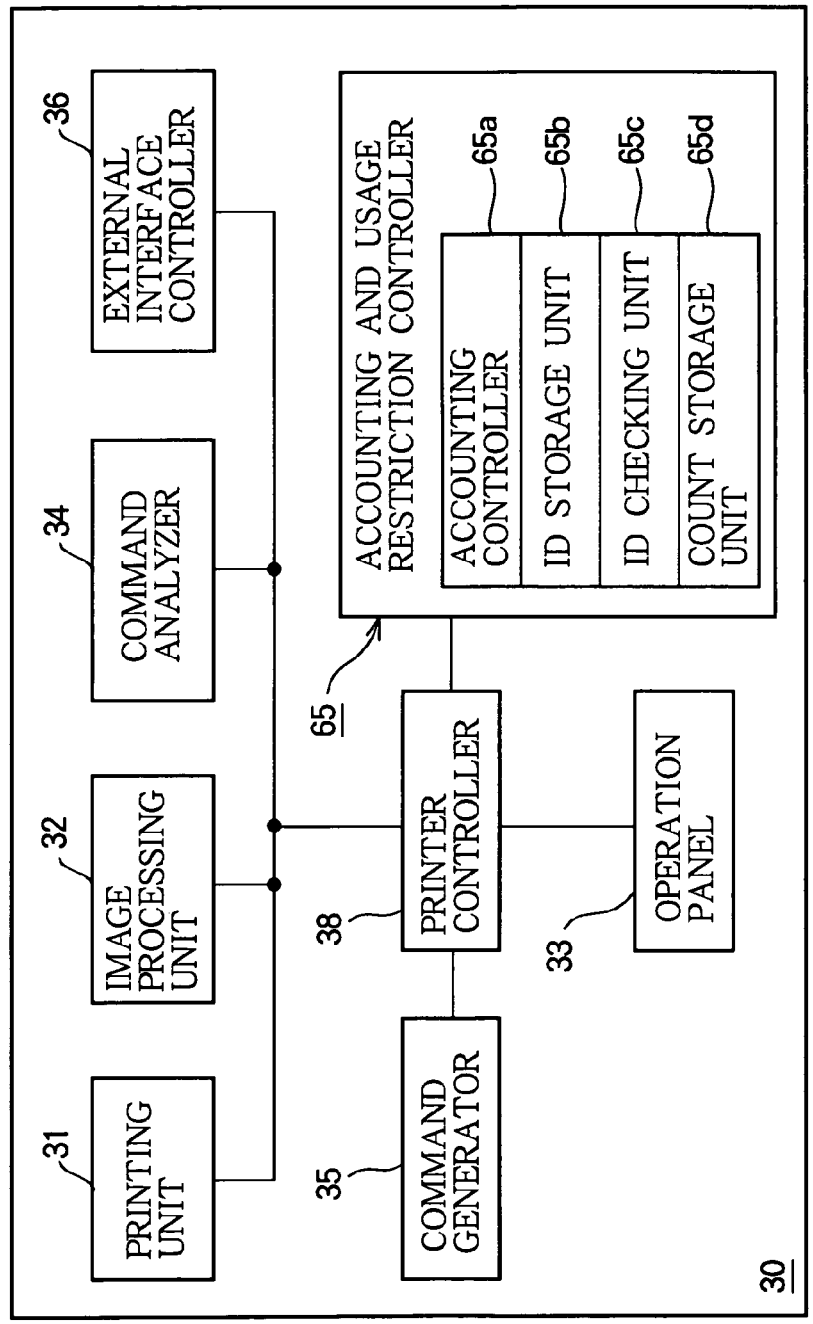
FIG. 23 is a block diagram of the printer in the fifth embodiment.

Next, the printer 30 in the fifth embodiment will be described. As shown in the block diagram in FIG. 23, the printer 30 is similar to the printer in the fourth embodiment, except that the accounting and usage restriction controller 65 has an ID storage unit 65b and an ID checking unit 65c instead of a scanner ID information storage unit.

In the fifth embodiment, the scanner 10 uses an account ID information query command to ask the printer 30 whether an account ID input on the scanner's operation panel 13 is registered in the ID storage unit 65b of the printer 30. The account ID information query command has the structure shown in FIG. 24, comprising a command type area 91 for identifying the command as an account ID information query command, an account ID area 92 for storing an account ID input on the scanner 10, a user ID area 93 for storing an arbitrary user ID input on the scanner 10, and a job name area 94 for identifying the command as originating from the scanner 10.

The printer 30 replies to an account ID information query command sent from the scanner 10 by sending an ID information query reply command with the structure shown in FIG. 25. This command comprises a command type area 101 for identifying the command as a account ID information query reply command, an account ID area 102, a user ID area 103, a job name area 104, and a result area 105 for indicating whether the account ID input on the scanner 10 is stored in the ID storage unit 65b or not.

Next, the operation of the fifth embodiment will be described.

When the account ID setting facility 13a of the scanner 10 is turned off, the system operates as described in the third and fourth embodiments, so the following description will deal only with the case in which the account ID setting facility 13a is turned on.

First, the operation of the scanner 10 in the fifth embodiment will be described.

In this embodiment, when the account ID setting facility 13a of the scanner 10 is turned on, a menu item prompting for input of an account ID is displayed on the operation panel 13 of the scanner 10. The operator operates the operation panel 13 and inputs an account ID. The command generator 15 then places the input account ID in the account ID area 92 of an account ID information query command. By way of example, if the number '1234' is input as an account ID, the account ID information query command may have the content shown in FIG. 26.

The external interface controller 17 now sends the account ID information query command to the printer 30. In the third embodiment, the accounting command is sent to the printer 30 together with the data to be printed, but in the fifth embodiment the account ID information query command is sent to the printer 30 to inquire whether the account ID is stored in the ID storage unit 65b before the data to be printed are sent to the printer 30.

Figure 27:
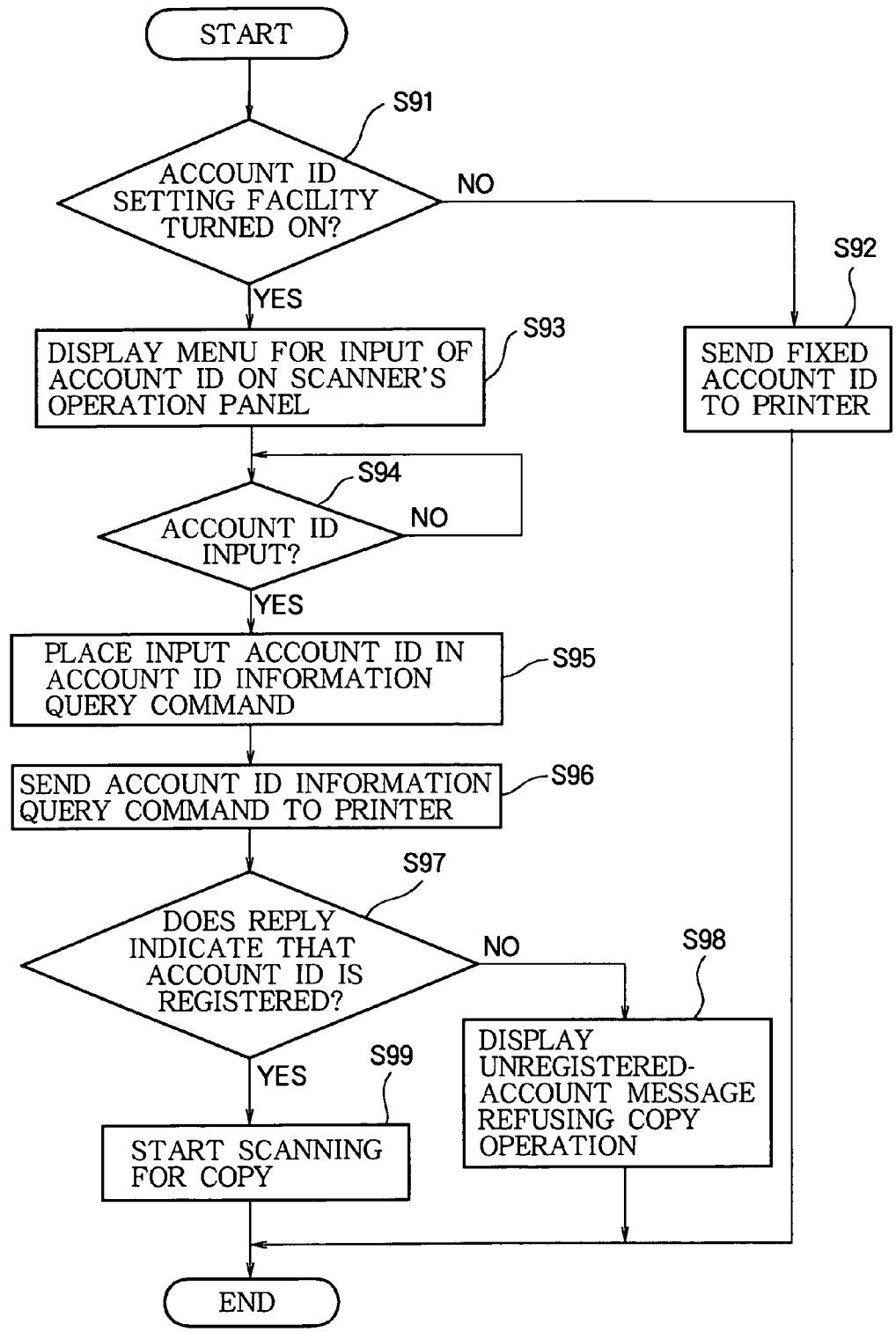
FIG. 27 is a flowchart illustrating the operation of the scanner in the fifth embodiment.

The scanner 10 in the fifth embodiment accordingly follows the procedure shown in the flowchart in FIG. 27.

In step S91, the account ID setting facility 13a is checked to decide whether it is turned on or not. If the account ID setting facility 13a is turned off, data including a fixed account ID are sent to the printer 30 in step S92, and the process terminates. If the account ID setting facility 13a is turned on, a menu item prompting for input of an account ID is displayed on the operation panel 13 of the scanner 10 in step S93. In step S94, processing waits for input of an account ID. When the account ID is input, it is placed in an account ID information query command in step S95. In step S96, the account ID information query command is sent to the printer 30. In step S97, the reply from the printer 30 is analyzed to determine whether it indicates that the account ID is registered in the printer 30. If the account ID is not registered, then in step S98 a message is displayed, indicating that the copying operation cannot be carried out because the account ID is not registered, and the process terminates. If the account ID is not registered, then a copying operation is started in step S99, after which the process terminates.

Next, the operation of the printer 30 in the fifth embodiment upon receiving an account ID information query command from the scanner 10 will be described. The command is received under the control of the external interface controller 36 and recognized as an account ID information query command by the command analyzer 34. The ID checking unit 65c in the accounting and usage restriction controller 65 then determines whether the account ID in the account ID information query command coincides with one of the account IDs stored in the ID storage unit 65b. The account IDs stored in the ID storage unit 65b may include IDs sent from computer terminals such as personal computers and servers, which are connected through a network (not shown) to the printer 30, as well as IDs sent from the scanner 10 when an account ID is registered on the scanner 10.

If the account ID in the account ID information query command coincides with one of the account IDs stored in the ID storage unit 65b, the command generator 35 generates an account ID information query reply command as shown in FIG. 28, setting the result area 105 to indicate that the account ID in question is registered. The account ID information query reply command is sent to the scanner 10 under the control of the external interface controller 36.

If the account ID in the account ID information query command does not coincide with any of the account IDs stored in the ID storage unit 65b, the command generator 35 generates an account ID information query reply command as shown in FIG. 29, setting the result area 105 to indicate that the account ID in question is not registered. The account ID information query reply command is sent to the scanner 10 under the control of the external interface controller 36.

The scanner 10 receives the account ID information query reply command from the printer 30 under the control of the external interface controller 17. The command analyzer 14 analyzes the content of the account ID information query reply command. If the content indicates that the account ID is registered, the copying operation is allowed. Otherwise, a message is displayed on the operation panel 13, indicating that the copying operation is not allowed because the account ID is not registered.

Figure 30:
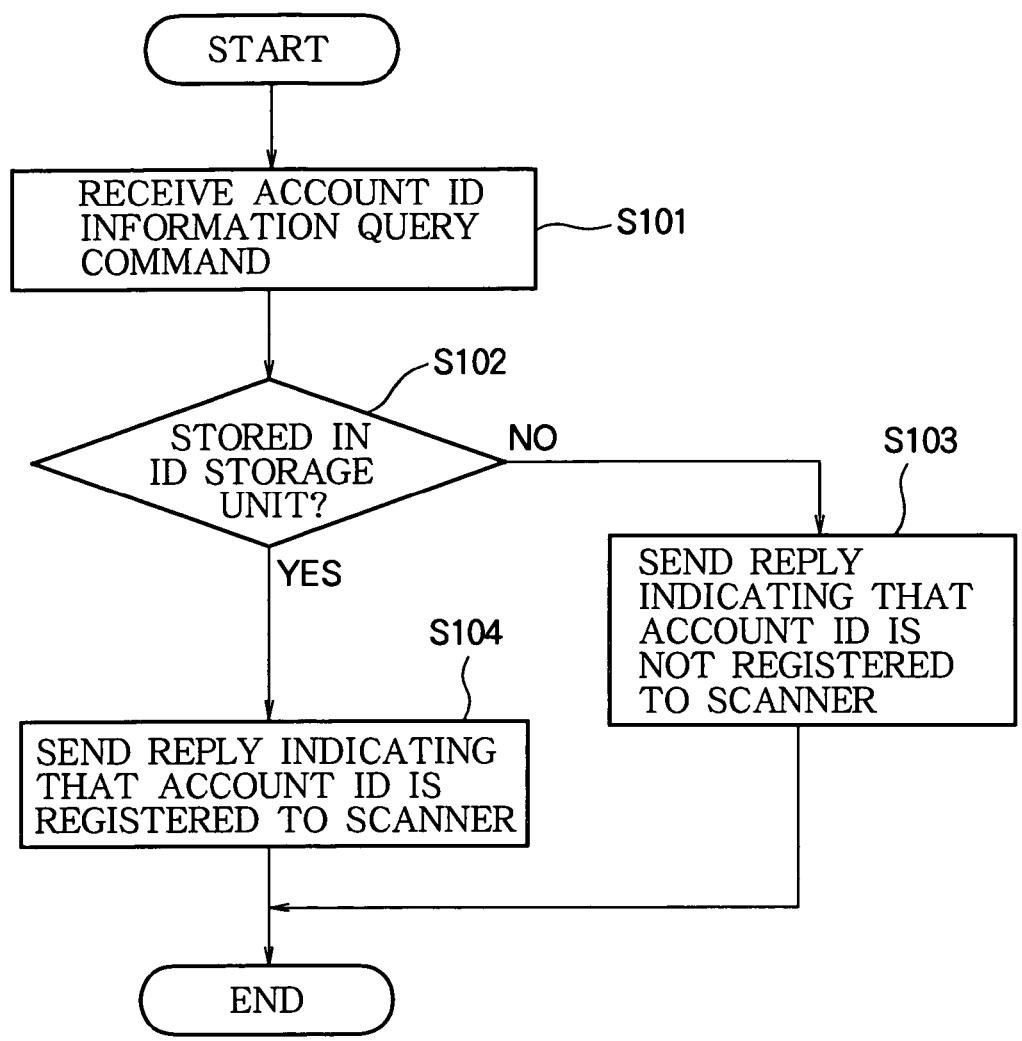
FIG. 30 is a flowchart illustrating the operation of the printer in the fifth embodiment.

The printer 30 accordingly follows the procedure shown in the flowchart in FIG. 30. In step S101, the printer 30 receives an account ID information query command. In step S102, the accounting controller 65a determines whether the account ID coincides with one of the account IDs stored in the ID storage unit 65b. If the account ID does not coincide with any of the account IDs stored in the ID storage unit 65b, a reply is sent to the scanner 10 in step S103, indicating that the account ID is not registered, and the process terminates. If the account ID coincides with one of the account IDs stored in the ID storage unit 65b, a different reply is sent to the scanner 10 in step S104, indicating that the account ID is registered, and the process terminates.

As described above, in the fifth embodiment, the scanner 10 and printer 30 carry out a bidirectional protocol for sending and receiving commands. The scanner 10 sends the input account ID to the printer 30 as an account ID information query command before sending the data to be printed. The printer 30 compares the received accounting command with its registered account IDs, and returns the result to the scanner 10 as an account ID information query reply command. Accordingly, the person operating the scanner 10 and can easily tell whether the input account ID has already been registered or not.

Like the third embodiment, the fifth embodiment can manage copying fees and restrict usage to authorized users at a low cost, without using copy cards, and the scanner does not have to store a table of account IDs. In addition, as in the fourth embodiment, the operator can immediately decide whether printing is allowed or not.

The present invention is not limited to the preceding embodiments. Those skilled in the art will recognize that further variations are possible within the scope of the invention, which is defined in the appended claims.

What is claimed is:

1. An image printing system, comprising:
a scanner for input of an image; and
a printing apparatus, communicating directly with the scanner, for printing an image corresponding to the image input by the scanner,
wherein the scanner comprises a command sending unit for sending to the printing apparatus a first command requesting option status information indicating the status of implementation of options in the printing apparatus,
wherein the printing apparatus comprises a response sending unit that responds to the first command by sending the option status information to the scanner,
wherein the scanner further comprises
an acquisition unit for acquiring the option status information sent by the response sending unit of the printing apparatus,
an information input unit,
a display unit for displaying the status implementation as represented by the option status information acquired by the acquisition unit, and for providing a user with prompts to use the information input unit to input information other than image information, the prompts provided to the user including a prompt to select whether or not to change the displayed status, wherein the command sending unit sends the printing apparatus the information input by the user, including a second command reflecting the selection made by the user, and wherein the printing apparatus operates according to the information input by the user using the information input unit of the scanner, and sent by the command sending unit.

2. The image printing system of claim 1, wherein the printing apparatus has a setting unit for setting printing conditions, the setting unit sets the printing conditions according to the information input by the information input unit of the scanner, and the printing apparatus operates according to said settings.

3. The image printing system of claim 1, wherein:
the options of the printing apparatus include at least one hardware option;
the option status information acquired by the acquisition unit includes information related to said at least one hardware option;
the prompts for information input include a prompt for input of information related to said at least one hardware option;
the command sending unit of the scanner sends the printing apparatus the information related to said at least one hardware option after input of said information from the information input unit; and
the printing apparatus prints according to the information received from the command sending unit of the scanner.

4. The image printing system of claim 1, wherein:
the options of the printing apparatus include an accounting option;
the option status information acquired by the acquisition unit includes information related to the accounting option;
the prompts for information input include a prompt for input of information identifying a user of the image printing system;
the command sending unit of the scanner sends the printing apparatus the information identifying the user of the image printing system after input of said information from the information input unit; and
the printing apparatus manages the accounting option according to the information identifying the user of the image printing system received from the apparatus command sending unit of the scanner.

5. The image printing system of claim 1, wherein the printing apparatus decides whether or not to print and output images according to the information input from the information input unit of the image input apparatus.

6. The image printing system of claim 1, wherein the scanner decides whether or not to send image information to the printing apparatus according to the information input from the information input unit.

7. The image printing system of claim 1, wherein the image input apparatus command sending unit of the scanner sends the information input from the information input unit to the printing apparatus and decides whether or not to send image information to the printing apparatus according to the information input from the information input unit.

8. The image printing system of claim 1, wherein the printing apparatus has an accounting unit for managing printing fees, the information input by the information input unit of the scanner includes information identifying a user of the image printing system, the accounting unit manages said printing fees according to the information identifying the user of the image printing system, and either the scanner or the printing apparatus uses the information input by the information input unit of the scanner to decide whether the printing apparatus is to print an image input by the scanner.

9. The image printing system of claim 1, wherein said command generator sends said first command when the scanner recognizes that the scanner is connected to the printing apparatus.

10. The image printing system of claim 1, wherein said acquisition unit also acquires from the printing apparatus information indicating whether or not each option should be displayed, and
the display unit displays the information concerning the option of the printing apparatus having been acquired, according to the information indicating whether or not each option should be displayed.

11. The image printing system of claim 1, wherein the printing apparatus further comprises an option information collector for collecting the option status information, and wherein the sending unit sends the option status information based on the information collected in the option status collector.

12. The image printing system of claim 1, further comprising a USB cable, the scanner communicating with the printing apparatus via the USB cable.

13. The image printing system of claim 1, wherein the scanner further comprises a scanner housing that houses the command sending unit, the acquisition unit, the information input unit, and the display unit, and wherein the printing apparatus comprises a printer housing that houses the response sending unit.

14. A scanner apparatus for input of an image and connectable to a printing apparatus for printing an image corresponding to the image input by the scanner apparatus, comprising:
a command sending unit for sending a first command to the printing apparatus requesting option status information indicating the status of implementation of options in the printing apparatus, the printing apparatus being responsive to the first command and sending the option status information to the scanner;
an acquisition unit for acquiring the option status information sent from the printing apparatus;
a display unit for displaying the status of implementation as represented by the option status information acquired by the acquisition unit, and prompts for input of information other than image information, including a prompt for input by the user to select whether to change the status or not; and
an information input unit for the input of the information other than image information;
wherein the command sending unit sends the printing apparatus the information input by the user using the information input unit, including a second command reflecting the selection made by the user, and
wherein the printing apparatus operates according to the information input by the information input unit of the scanner apparatus, and sent by the command sending unit.

15. The scanner apparatus of claim 14, wherein said command sending unit sends said command requesting said option status information when the scanner apparatus recognizes that the scanner apparatus is connected to the printing apparatus.

16. The scanner apparatus of claim 14, wherein said acquisition unit also acquires from the printing apparatus information indicating whether or not each option should be displayed, and the display unit displays the information concerning the option of the printing apparatus having been acquired, according to the information indicating whether or not each option should be displayed.

17. The scanner apparatus of claim 14, further comprising a scanner housing that houses the command sending unit, the acquisition unit, the information input unit, and the display unit.

18. The image input apparatus of claim 14, wherein:

the display unit also displays a prompt for input of information identifying a user of the input scanner apparatus, if the information acquired by the acquisition unit includes information concerning an accounting function; and the information input unit is also used for input of the information identifying the user of the scanner apparatus, said information being sent to the printing apparatus.

19. The scanner apparatus of claim 18, wherein the information identifying the user of the scanner apparatus is sent to the printing apparatus together with image information.

20. The scanner apparatus of claim 18, wherein the scanner apparatus decides whether or not to send image information to the printing apparatus according to said information identifying the user of the scanner apparatus.

21. The scanner apparatus of claim 18, wherein the scanner apparatus sends the information identifying the user of the scanner apparatus to the printing apparatus before sending image information to the printing apparatus, and decides whether to send the image information according to a reply from the printing apparatus.

* * * * *